(12) United States Patent
Henner et al.

(10) Patent No.: US 9,353,764 B2
(45) Date of Patent: May 31, 2016

(54) FAN PROPELLER, IN PARTICULAR FOR A MOTOR VEHICLE

(75) Inventors: Manuel Henner, Auffargis (FR); Bruno Demory, Marines (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 1004 days.

(21) Appl. No.: 13/514,153

(22) PCT Filed: Nov. 8, 2010

(86) PCT No.: PCT/EP2010/067007
§ 371 (c)(1),
(2), (4) Date: Oct. 19, 2012

(87) PCT Pub. No.: WO2011/069762
PCT Pub. Date: Jun. 16, 2011

(65) Prior Publication Data
US 2013/0028747 A1 Jan. 31, 2013

(30) Foreign Application Priority Data

Dec. 7, 2009 (FR) ..................................... 09 05893

(51) Int. Cl.
*F04D 29/38* (2006.01)
(52) U.S. Cl.
CPC ............ *F04D 29/386* (2013.01); *F04D 29/384* (2013.01)
(58) Field of Classification Search
CPC ....... F04D 19/00; F04D 19/002; F04D 29/32; F04D 29/324; F04D 29/325; F04D 29/38; B63H 1/26

USPC .................................................. 416/242, 203
See application file for complete search history.

(56) References Cited

U.S. PATENT DOCUMENTS

| 1,506,937 | A | 9/1924 | Miller |
| 4,197,057 | A | 4/1980 | Hayashi |
| 4,915,588 | A | 4/1990 | Brackett |
| 6,116,856 | A | 9/2000 | Karadgy et al. |
| 6,866,414 | B2 * | 3/2005 | Kupidlowski .......... B01F 7/001 366/330.3 |
| 2004/0227035 | A1 | 11/2004 | Hubbard |
| 2008/0019826 | A1 * | 1/2008 | Arinaga ................ F04D 29/384 415/206 |

FOREIGN PATENT DOCUMENTS

GB 513863 A 10/1939

OTHER PUBLICATIONS

Translation of International Search Report issued in PCT/EP2010/067007, mailed on Jul. 8, 2011, 3 pages.

* cited by examiner

*Primary Examiner* — Craig Kim
*Assistant Examiner* — Michael Sehn
(74) *Attorney, Agent, or Firm* — Osha Liang LLP

(57) ABSTRACT

A fan propeller comprises blades (14), each of which has a general profile of the aircraft wing type, with a leading edge (28) and a trailing edge (30), a neutral axis (32) and a span (36) between the leading edge (28) and the trailing edge (30). According to one embodiment, the blade (14) has, on at least part of its length, a profile shaped such that the neutral axis (32) makes possible a point of contraflexure (34), and has two opposite concavities, i.e. a positive concavity ($C_1$) between the leading edge (28) and the point of contraflexure (34), and a negative concavity ($C_2$) between the point of contraflexure (34) and the trailing edge (30). Application to motor vehicles.

17 Claims, 4 Drawing Sheets

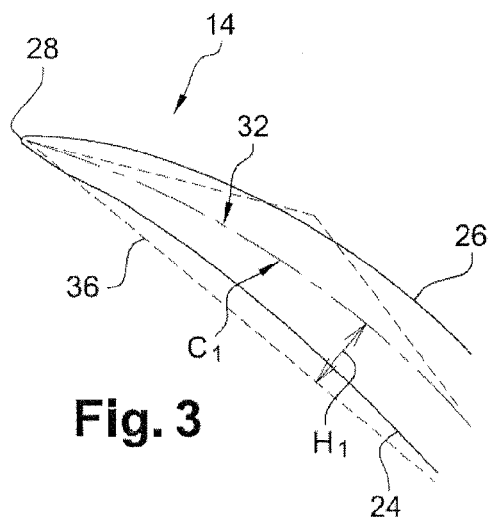
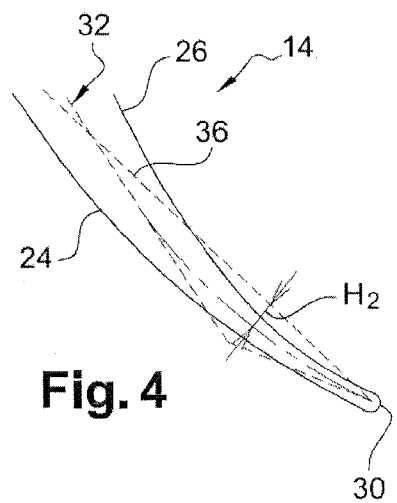
Fig. 3
Fig. 4
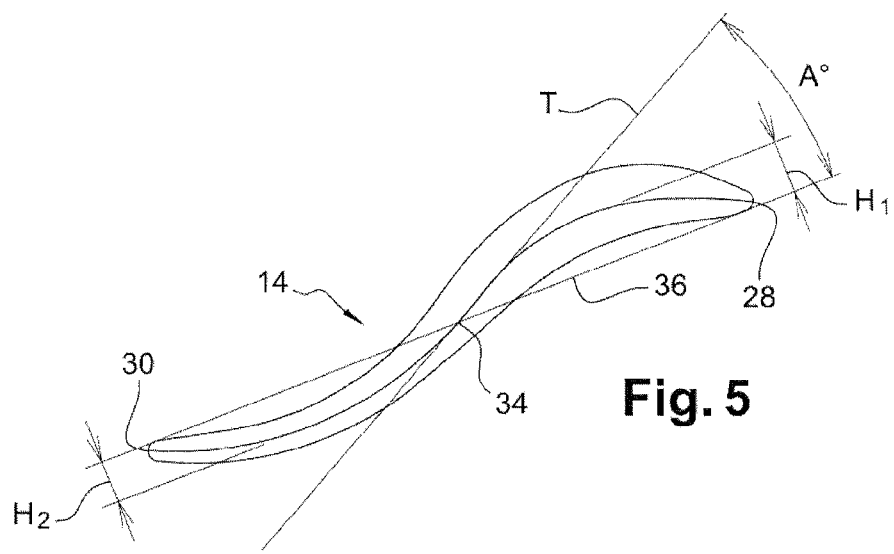
Fig. 5
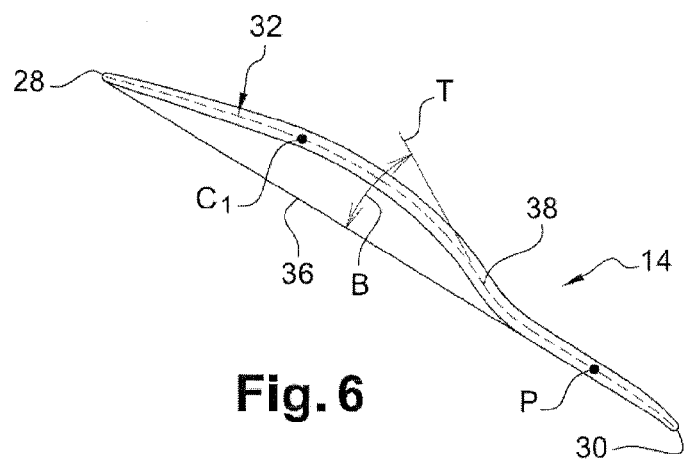
Fig. 6

FAN PROPELLER, IN PARTICULAR FOR A MOTOR VEHICLE

The invention relates to fan propellers.

It concerns more particularly a fan propeller comprising a hub and blades which extend radially towards the exterior from the hub, wherein each blade has a general profile, in particular of the aircraft wing type, with a leading edge and a trailing edge, a neutral axis and a span between the leading edge and the trailing edge.

A propeller of this type can be used in particular in motor vehicle equipment, for example in an engine fan unit in order to accelerate a flow of air through a cooling module comprising one or more heat exchangers, including the vehicle engine cooling radiator.

The propeller is then secured to a shaft of an electric motor in order to be rotated.

The propeller blades extend from the hub, and the outer ends of said propeller blades are free or are joined by a profiled ring which is also known as a "guide".

In the application which is specific to a motor vehicle engine fan unit, the propeller must operate in a wide range of conditions and must be able to produce a high flow rate of air with a very low energy requirement.

In order to satisfy these conditions, the propellers are conventionally equipped with a small number of blades (typically between 5 and 9), each blade having a span with a limited length, so as to reduce the torque of the fan.

Consequently, many fans which are used in applications for motor vehicles have a low ratio of geometric spacing in a given radius, starting from the centre of the propeller. This ratio, which is also known as "solidity", is defined as the length of span multiplied by the number of blades and divided by the perimeter for the radius concerned. Thus, this ratio is all the higher, the more blades the propeller has, and the larger the span of the blades.

Fan propellers with a low level of solidity have the disadvantage that they are very sensitive to the operating conditions, to the vicinity of other mechanical components, and to the phenomena of recirculation of air at the ends of the blades. In unfavorable conditions, the global efficiency drops, leading to poor cooling conditions and/or higher energy requirements in order to drive the fan with a sufficient speed of rotation.

In addition, in these known fans, the propeller blades always have a conventional profile of the aircraft wing type, wherein the neutral axis of the profile has concavity in the same direction.

The object of the invention is in particular to overcome the above-described disadvantages.

Its objective is in particular to provide a fan propeller which can operate in a wide range of operating conditions, whilst providing a high flow rate, as well as having a low energy requirement.

For this purpose, according to a first embodiment of the invention, it is proposed that the blade has, on at least part of its length, a profile formed in the shape of a flattened S, such that the neutral axis makes possible a point of contraflexure, and has two opposite concavities, i.e. a positive concavity between the leading edge and the point of contraflexure, and a negative concavity between the point of contraflexure and the trailing edge.

Thus, each of the blades is characterized by a specific shape of the profile, on at least part of its length, which makes it possible to maintain the solidity at a suitable value without increasing considerably the drag, and consequently the torque of the fan.

This particular aerodynamic profile is derived from the fact that its neutral axis makes possible a point of contraflexure, which permits definition of two successive curves with respective opposite directions.

Thanks to this particular profile, it is possible to produce propellers which have improved performance, and the operation of which is less affected by the drop in efficiency.

The point of contraflexure is advantageously situated at between 20% and 80% of the length of the span, starting from the leading edge.

However, it is preferable for the point of contraflexure to be situated closer to the trailing edge than to the leading edge.

According to another characteristic of the invention, the tangent to the neutral axis at the level of the point of contraflexure intersects the span and forms a minimum angle of 4°, and preferably of 10 to 20°.

Advantageously, the positive concavity of the profile has a camber of at least 2%, and the negative concavity of the profile has a camber of at least 2%, the camber being defined as the ratio between the height of the neutral axis relative to the span and the length of the span.

According to a second embodiment of the invention, the blade has, on at least part of its length, a profile shaped such that the neutral axis has positive concavity between the leading edge and an intermediate point, and a generally flat part between this intermediate point and the trailing edge.

Advantageously, the tangent to the neutral axis, in particular in the region of the intermediate point, intersects the span and forms an angle of at least 4°, said angle being considered in the location where the angle between the tangent to the neutral axis and the span is maximal.

According to another characteristic of the invention, the intermediate point corresponds substantially to a point of contraflexure of the neutral axis.

The generally flat part preferably has a length of between 20% and 60% of the length of the span.

The profile shaped according to the first or second embodiment of the invention is not necessarily present along the entire length of the blade, from its root at the level of the hub, to its outer end.

Thus, according to a preferred embodiment, the blade has a developing profile which starts from said shaped profile in the region of the root, at the level of the hub, and ends in a profile of the aircraft wing type, without a point of contraflexure of the neutral axis, in the end region of the blade.

According to another characteristic of the invention, the fan propeller has solidity which is at least 0.5. Advantageously, the solidity decreases from the root of the blades at the level of the hub, going towards the end of the blades.

For example, the solidity varies from approximately 0.9 to approximately 0.5 from the root of the blades to the end of the blades.

In the following detailed description, provided purely by way of example, reference is made to the attached drawings, in which:

FIG. 3 is a detail on an enlarged scale of the blade in FIG. 2 in the region of the leading edge;

FIG. 4 is a detail on an enlarged scale of the blade in FIG. 2 in the region of the trailing edge;

FIG. 5 represents a flattened transverse cross section of another blade according to the first embodiment of the invention, showing the respective cambers of the positive concavity and the negative concavity of the profile;

FIG. 6 represents a developed transverse cross section of a blade according to a second embodiment of the invention;

Figure 1:
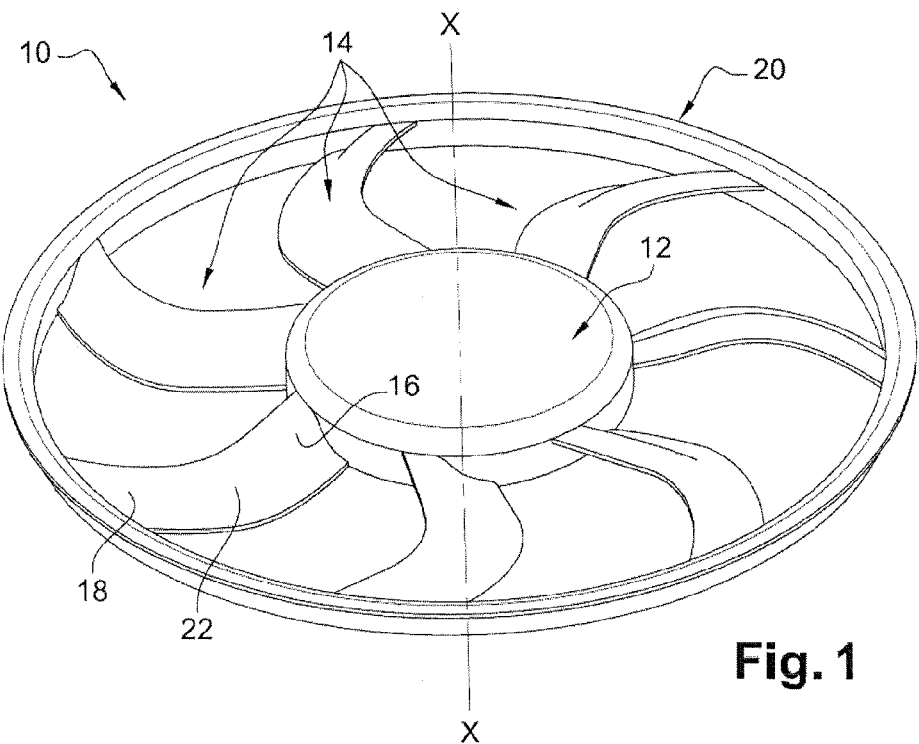
FIG. 1 is a view in perspective of a fan propeller according to the invention.

Reference is made firstly to FIG. 1, which shows a propeller 10 according to the invention, which, in the example, is designed to form part of an engine fan unit of a motor vehicle. This propeller is advantageously produced in a single piece by molding of an appropriate plastic material, for example a polyamide filled with fibers or glass balls. The propeller 10 comprises a hub 12, also known as a "bowl", which can be wedged onto a drive shaft (not represented) of an electric motor in order to be rotated around an axis XX according to a given direction of rotation.

A plurality of blades 14, and in the example seven of them, extend radially from the hub 12. These blades have an inner end 16 (also known as the "root" or "foot") which is attached to the hub 12, and an outer end 18, which in this case is connected to an outer ring 20 (also known as the "guide"). However, in a variant, not represented, the outer ends 18 of the blades can be free. An intermediate region 22 extends between the ends 16 and 18.

Figure 2:
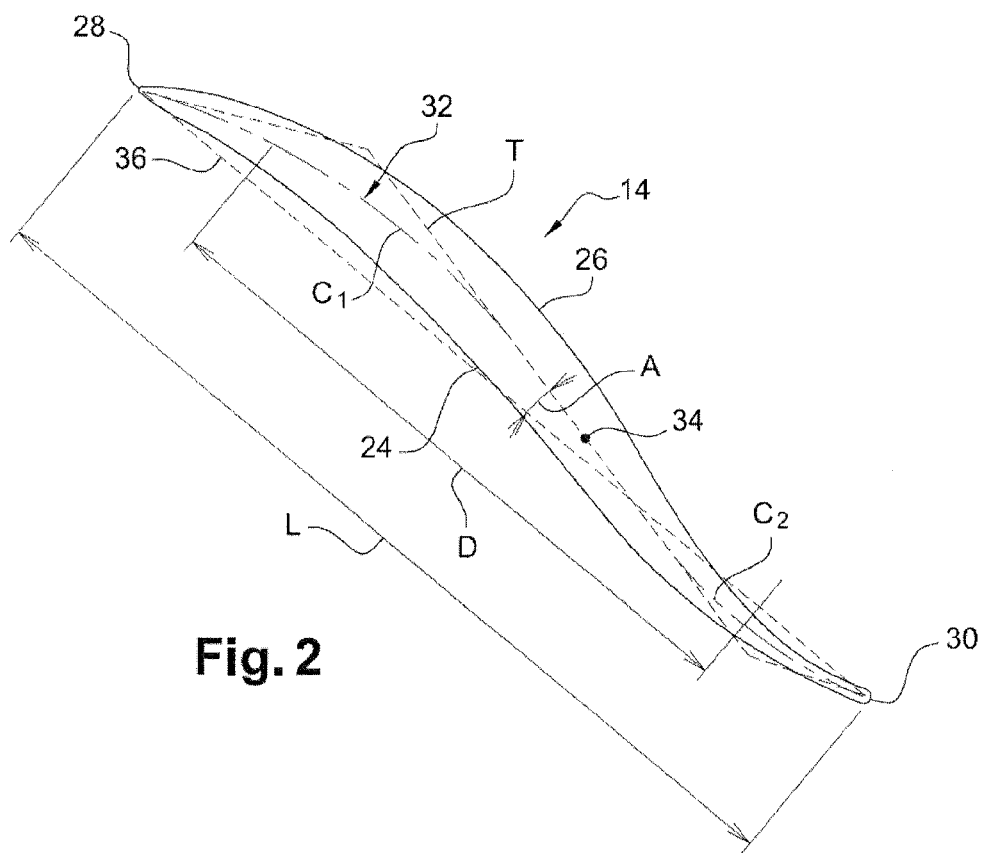
FIG. 2 represents a developed transverse cross section of a blade according to a first embodiment of the invention.

Reference is now made to FIG. 2, which shows the flattened transverse cross section of a blade 14, i.e. the flat closed curve which is obtained by intersecting the blade by a cylindrical surface of revolution around the axis XX of the propeller, and by flattening this cylindrical surface. The blade 14 has a shaped profile which is in the form of a flattened S. This profile is delimited by an inner, line 24 with a curved form and an outer line 26 with a curved form, these two lines being connected at a leading edge 28 and a trailing edge 30.

The shaped profile in this case has a characteristic shape with a neutral axis 32 which makes possible a point of contraflexure 34. It will be remembered that the neutral axis corresponds to a median line which, in the first approximation, is situated half-way from the inner line 24 and the outer line 26 which delimit the profile. As a result of this point of contraflexure, the neutral axis 32 has an inversion of curvature or concavity. It therefore has two opposite concavities, i.e. a positive concavity $C_1$ between the leading edge 28 and the point of contraflexure 34, and a negative concavity $C_2$ between the point of contraflexure 34 and the trailing edge 30. The neutral axis 32 thus extends from the two sides of the span 36 which connects the leading edge 28 and the trailing edge 30.

As can be seen in FIG. 2, the point of contraflexure 34 is situated at between 20% and 80% of the length L of the span, starting from the leading edge. The field D in which the point of contraflexure 34 is situated takes the form of a cambered segment in FIG. 2. Generally, it is preferable for the point of contraflexure 34 to be situated closer to the trailing edge 30 than to the leading edge 28, as is the case in FIG. 2.

The tangent T to the neutral axis, at the level of the point of contraflexure, intersects the span 36, and forms an angle A of at least 4°. Preferably, this angle A will be between 10 and 20°. The greater this angle, the more the concavities $C_1$ and/or $C_2$ will be pronounced:

The positive concavity $C_1$ of the profile has a camber of at least 2%, the camber being defined as the ratio between the height $H_1$ of the neutral axis 32 relative to the span 36 and the length L of the span (FIG. 3). This camber can for example be between 4 and 8%.

Similarly, the negative concavity $C_2$ of the profile has a camber of at least 2%, the camber being defined as the ratio between the height $H_2$ of the neutral axis 32 relative to the span 36 and the length L of the span (FIG. 4). This camber can for example be between 4 and 8%.

In the example represented, $H_1$ is greater than $H_2$, and consequently the camber of the concavity $C_1$ is greater than the camber of the concavity $C_2$.

FIG. 5 shows another profile of a blade similar to that in FIG. 2 where the heights $H_1$ and $H_2$ and the angle A are indicated.

FIG. 6 represents the flattened transverse cross section of a blade 14 according to a second embodiment of the invention, showing another blade profile which is similar to that of the above-described first embodiment. In this case, the blade has, on at least part of its length, a profile shaped such that the neutral axis 32 has positive concavity $C_1$ between the leading edge 28 and an intermediate point 38, and a generally flat part P between this intermediate point 38 and the trailing edge 30.

In a characteristic manner, the tangent T to the neutral axis in the region of the intermediate point 38 intersects the span 36 and forms an angle B of at least 4°. This angle B is considered in the location where the angle between the tangent to the neutral axis and the span is maximal. It is preferably between 10 and 20°, for example 8° and 12°.

The intermediate point 38 corresponds substantially to a point of contraflexure of the neutral axis 32 which is situated at the junction of the positive concavity $C_1$ and the generally flat part P.

The generally flat part P has a length L which is generally between 10 and 80% and in particular between 20% and 60% of the length L of the span 36. In the example in FIG. 6, the length L corresponds substantially to a third of the length L. In the example, the intermediate point 38 is thus situated closer to the trailing edge 30 than to the leading edge 28.

The profile shaped according to the first or second embodiment of the invention can be present along the entire length of the blade, or along only part of this length. In the example, the blade has a shaped profile which develops from the region of the root of the blade at the level of the hub, as far as the end region of the blade.

Figure 7:
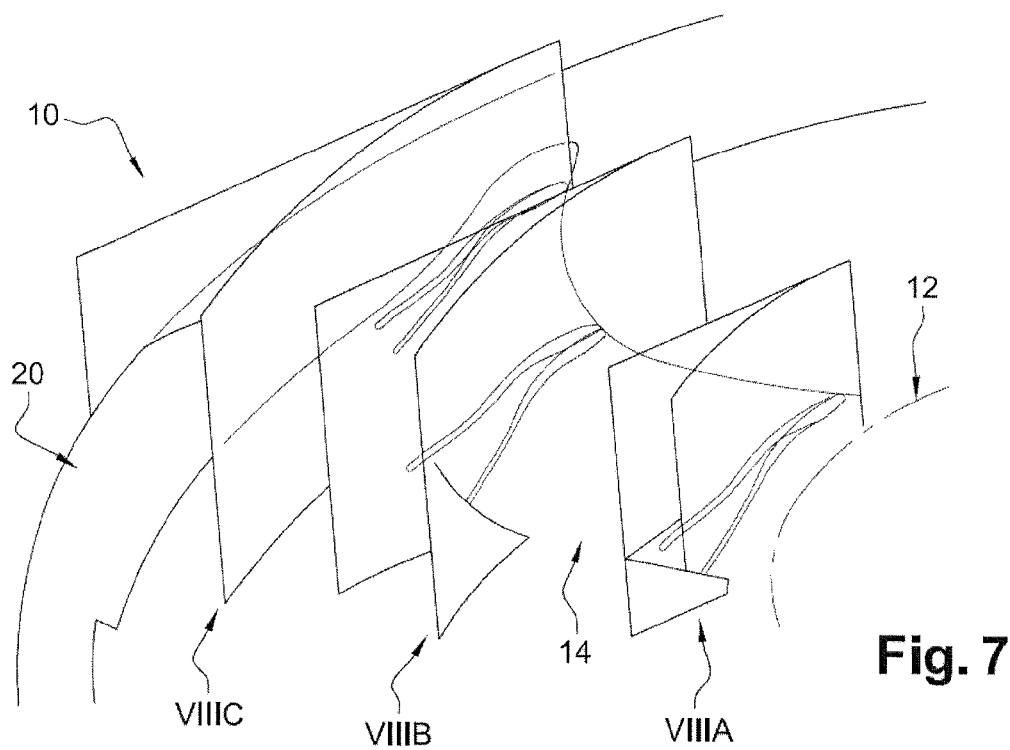
FIG. 7 is a partial view in perspective of a fan propeller similar to that in FIG. 1, representing three cylindrical cross sections of a blade, respectively in a region close to the hub, in an intermediate region, and in a region close to the ring of the propeller.

Reference is now made to FIGS. 7 and 8A, 8B and 8C in order to describe an example of a developing profile in the case of the first embodiment of the invention. FIG. 7 is a partial view of a propeller, one of the blades of which is cut in three locations according to cylindrical cross sections VIIIA, VIIIB and VIIIC respectively in the region of the root close to the hub, in an intermediate region, and in a region close to the outer end, close to the ring.

Figure 8A:
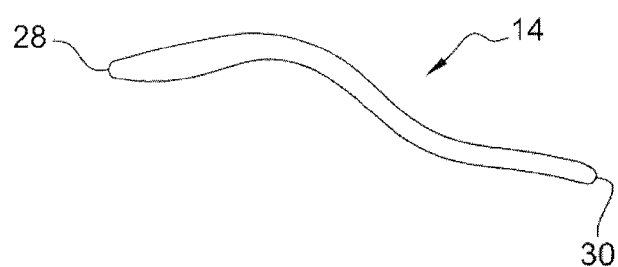
FIGS. 8A, 8B and 8C show respectively the flattened transverse cross sections of the blade profile corresponding to the three cross sections in FIG. 7.
Figure 8B:
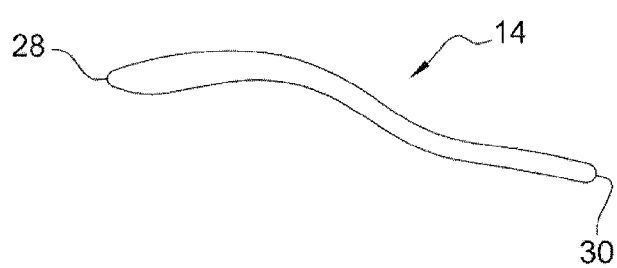
Figure 8C:
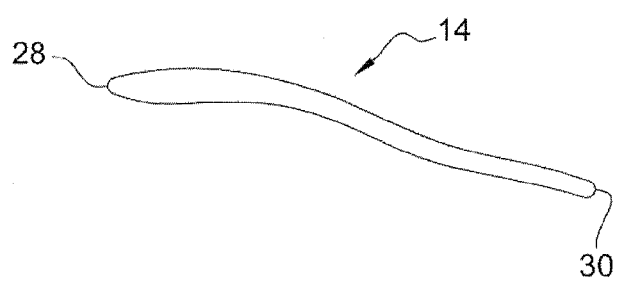

FIGS. 8A, 8B and 8C are the corresponding developed transverse cross sections. They show the variations of the profile from the inner end region 16 (root) as far as the outer end region 18, passing via the intermediate region 22 (FIG. 5B). It can be seen that the profile is far more cambered in the root region (Figure BA) than in the outer region (FIG. 8C), and passes through a transition (FIG. 8B).

Other blade profiles are possible provided that the shaped profile (in the form of a flattened S in the example) is present along at least part of the length of the blade. Thus, the profile can go progressively from a specific form according to the first or second embodiment of the invention, to a conventional form of the aircraft wing type, without inversion of curvature and without a point of contraflexure.

In the first embodiment, the positive concavity is extended by a negative concavity, whereas in the second embodiment the positive concavity is extended by a generally flat part. In both cases, the positive concavity comprises an extension (negative concavity or generally flat part) which extends as far as the trailing edge, and affects the flow of the fluid which is put into motion by the propeller.

The operation of a propeller according to the invention will now be explained, in comparison with a propeller according to the prior art.

Figure 9:
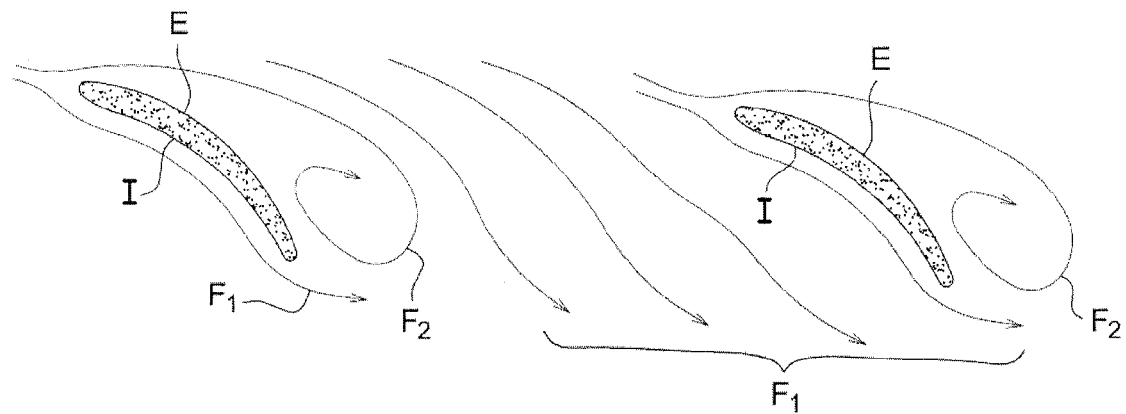
FIG. 9 shows schematically a diagram of the air flow between two blades of a propeller according to the prior art.

Reference is made firstly to FIG. 9, which shows schematically the air flow lines of a propeller according to the prior art, the blades of which have a conventional profile of the aircraft wing type, and the solidity of which (as previously defined) is low.

As Euler's theory explains, for turbine engines the increase in pressure depends on the deflection of the flow along the span of the blade. Many aerodynamic profiles have been used in order to obtain deflection of this type. Better guiding is obtained with a high level of solidity, i.e. with the blades close to one another.

On the other hand, in the case of low solidity, the guiding of the flow is less efficient, and separations of flow are obtained on the leading edge side, as shown by the diagram in FIG. 9. It can be seen in this diagram that the flows of air tend to separate and form turbulence on the top camber side (arrows $F_2$), whereas these flows of air are well guided on the lower camber side I (arrows $F_1$).

The conventional solution in order to avoid formation of this turbulence is to increase the solidity, either by means of longer spans for conventional profiles, or with more blades, which increases the fan torque. However, a solution of this type is not always compatible with the technical constraints of the direct current electric motors which are used in the engine fans of motor vehicles.

The invention makes it possible to avoid disadvantages of this type by means of use of a profile as previously defined.

Figure 10:
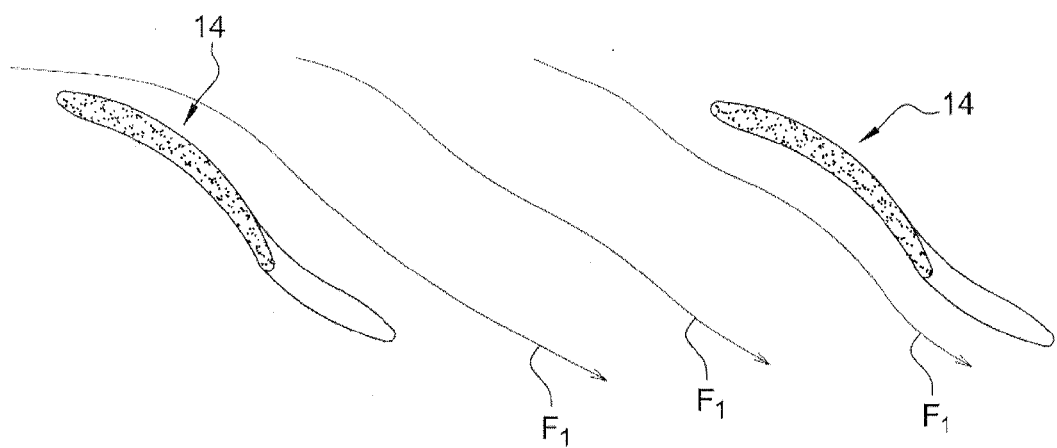
FIG. 10 shows schematically a diagram of the air flow between two blades of a propeller according to the invention.

FIG. 10 shows that, as a result of the shaped profile according to the invention (which in the example is in the form of a flattened S), the air flow lines $F_1$ continue to be joined together, without separation or creation of turbulence as in the case in FIG. 9. These lines are thus guided and squeezed between the blades 14. The same result can be obtained with a profile which is shaped according to the second embodiment of the invention.

In the case of the invention, the solidity is advantageously at least 0.5, and it can vary from approximately 0.9 to approximately 0.5 from the root of the blades as far as the end of the blades. By way of comparison, for a conventional blade, this solidity varies from approximately 0.7 at the root, to 0.3 at the end. Thus, with a higher level of solidity, but with a profile which is shaped according to the first or second embodiment of the invention, better performance is obtained, without generating turbulence or other disturbances, and without requiring a higher level of torque.

The preferential application of the invention is in the engine fan units of motor vehicles.

The invention claimed is:

1. A fan propeller comprising:
    a hub and blades which extend radially towards the exterior from the hub wherein each blade has a developing profile with a neutral axis and a span which extends between a leading edge and a trailing edge of said blade,
    wherein each blade has, on at least part of a length of each blade, a first profile formed in the shape of a flattened S, such that the neutral axis makes possible a point of contraflexure, and has two opposite concavities comprising a positive concavity between the leading edge and the point of contraflexure, and a negative concavity between the point of contraflexure and the trailing edge,
    wherein each blade has a second profile which starts from the second profile in a region at the level of the hub, and ends in a profile of an aircraft wing type, without a point of contraflexure of the neutral axis in an end re ion of the blade.

2. The fan propeller as claimed in claim 1, wherein the point of contraflexure is situated at between 20% and 80% of the length of the span, starting from the leading edge.

3. The fan propeller as claimed in claim 1, wherein the point of contraflexure is situated closer to the trailing edge than to the leading edge.

4. The fan propeller as claimed in claim 1, wherein a tangent to the neutral axis at a level of the point of contraflexure intersects the span and forms an angle of at least 4°.

5. The fan propeller as claimed in claim 1, wherein the positive concavity of the first profile has a camber of at least 2%, the camber being defined as the ratio between a height of the neutral axis relative to the span and a length of the span.

6. The fan propeller as claimed in claim 5, wherein the negative concavity of the first profile has a camber of at least 2%, the camber being defined as the ratio between the height of the neutral axis relative to the span and the length of the span.

7. The fan propeller as claimed in claim 1, wherein the fan propeller comprises solidity which is at least 0.5, the solidity being defined as a length of span of the blade, multiplied by a number of blades, and divided by a perimeter in a given radius.

8. The fan propeller as claimed in claim 7, wherein the solidity decreases from a root of the blades at a level of the hub, going towards an end of the blades.

9. The fan propeller as claimed in claim 8, wherein the solidity varies from approximately 0.9 to approximately 0.5 from the root of the blades to the end of the blades.

10. A fan propeller comprising:
    a hub and blades which extend radially towards the exterior from the hub, wherein each blade has a developing profile with a neutral axis and a span which extends between a leading edge and a trailing edge of each blade,
    wherein each blade has, on at least part of a length of each blade, a first profile shaped such that the neutral axis has positive concavity between the leading edge and an intermediate point, and a flat part between the intermediate point and the trailing edge,
    wherein each blade has a second profile which starts from the second profile in a region at the level of the hub, and ends in a profile of an aircraft wing type, without a point of contraflexure of the neutral axis, in an end region of the blade.

11. The fan propeller as claimed in claim 10, wherein a tangent to the neutral axis intersects the span and forms an angle of at least 4°, said angle being in a location where the angle between the tangent to the neutral axis and the span is maximal.

12. The fan propeller as claimed in claim 11, wherein the angle is between 8° and 12°.

13. The fan propeller as claimed in claim 10, wherein the intermediate point corresponds substantially to a point of contraflexure of the neutral axis.

14. The fan propeller as claimed in claim 10, wherein the flat part has a length of between 20% and 60% of a length of the span.

15. The fan propeller as claimed in claim 10, wherein the fan propeller comprises solidity which is at least 0.5, the solidity being defined as a length of span of the blade, multiplied by a number of blades, and divided by a perimeter in a given radius.

16. The fan propeller as claimed in claim 15, wherein the solidity decreases from a root of the blades at a level of the hub, going towards an end of the blades.

17. The fan propeller as claimed in claim 16, wherein the solidity varies from approximately 0.9 to approximately 0.5 from the root of the blades to the end of the blades.

* * * * *